(12) United States Patent
Amatucci et al.

(10) Patent No.: US 8,039,149 B2
(45) Date of Patent: *Oct. 18, 2011

(54) BISMUTH OXYFLUORIDE BASED NANOCOMPOSITES AS ELECTRODE MATERIALS

(75) Inventors: Glenn G. Amatucci, Peapack, NJ (US); Mathieu Bervas, Aix en Provence (FR)

(73) Assignee: Rutgers, The State University, New Brunswick, NJ (US)

( * ) Notice: Subject to any disclaimer, the term of this patent is extended or adjusted under 35 U.S.C. 154(b) by 888 days.

This patent is subject to a terminal disclaimer.

(21) Appl. No.: 11/355,430

(22) Filed: Feb. 16, 2006

(65) Prior Publication Data

US 2007/0190414 A1 Aug. 16, 2007

Related U.S. Application Data

(63) Continuation-in-part of application No. PCT/US2005/035625, filed on Sep. 30, 2005.

(60) Provisional application No. 60/615,480, filed on Oct. 1, 2004.

(51) Int. Cl.
*H01M 4/58* (2010.01)
*C01G 29/00* (2006.01)

(52) U.S. Cl. ............... 429/218.1; 429/232; 423/462; 423/464; 423/594.7; 423/617

(58) Field of Classification Search .............. 423/462, 423/464, 594.7, 617; 429/218.1, 232
See application file for complete search history.

(56) References Cited

U.S. PATENT DOCUMENTS

| | | | | | |
|---|---|---|---|---|---|
| 2,722,490 | A | * | 11/1955 | Haynes et al. | 257/788 |
| 2,722,559 | A | * | 11/1955 | Farlow et al. | 570/150 |
| 4,127,708 | A | * | 11/1978 | Liang et al. | 429/218.1 X |
| 4,845,015 | A | * | 7/1989 | Kurematsu et al. | 430/372 |
| 6,379,841 | B1 | | 4/2002 | Potanin et al. | |
| 6,423,131 | B1 | | 7/2002 | Seeger et al. | |
| 6,686,090 | B2 | | 2/2004 | Inagaki et al. | |
| 6,753,112 | B2 | * | 6/2004 | Ooya et al. | 429/232 |
| 6,835,499 | B2 | * | 12/2004 | Phillips | 429/232 X |
| 7,169,471 | B1 | | 1/2007 | Dreher et al. | |
| 2004/0062994 | A1 | | 4/2004 | Amatucci et al. | |
| 2007/0243466 | A1 | * | 10/2007 | Amatucci et al. | 429/218.1 |

OTHER PUBLICATIONS

Badway et al., Carbon-Metal Fluoride Nanocomposites, Journal of the Electrochemical Society, 150(9) A1209-A1218 (2003).
Bervas et al., Bismuth Fluoride Nanocomposite as a Positive Electrode Material for Rechargeable Lithium Batteries, Electromechanical and Solid-State Letters, 8 (4) A147-A183 (2005).
Hajime Arai, Shigeto Okada, Yoji Sakurai and Jun-ichi Yamaki. "Cathode Performance and Voltage Estimation of Metal Trihalides", Journal of Power Sources, 68, 716-719 (1997).
A. Robert Armstrong and Peter G. Bruce. "Synthesis of Layered LiMnO2 as an Electrode for Rechargeable Lithium Batteries", Nature, 381, 499-500 (1996).
F. Badway, F. Cosandey, N. Pereira and G. G. Amatucci. "High-Capacity Reversible Metal Fluoride Conversion Materials as Rechargeable Positive Electrodes for Li Batteries", Journal of the Electrochemical Society, 150 (10), A1318-A1327 (2003).

(Continued)

*Primary Examiner* — Stephen J. Kalafut
(74) *Attorney, Agent, or Firm* — Beverly W. Lubit; Greenberg Traurig LLP

(57) ABSTRACT

The present invention relates to bismuth oxyfluoride nanocomposites used as positive electrodes in primary and rechargeable electromechanical energy storage systems.

83 Claims, 10 Drawing Sheets

OTHER PUBLICATIONS

M. Bervas, L.C. Klein and G. G. Amatucci. "Reversible Conversion Reactions with Lithium in Bismuth Oxyfluoride Nanocomposites", Journal of the Electrochemical Society, 153 (4), A159-A170 (2006).

M. Bervas, A.N. Mansour, W.-S. Yoon, J.F. Al-Sharab, F. Badway, F. Cosandey, L.C. Klein and G. G. Amatucci. "Investigation of the Lithiation and Delithiation Conversion Mechanisms of Bismuth Fluoride Nanocomposites", Journal of the Electrochemical Society, 153 (1), A799-A808 (2006).

P. Fiordiponti, S. Panero, G. Pistoia and C. Temperoni. "Nonaqueous Batteries with $BiF_3$ Cathodes", Journal of the Electrochemical Society, 125 (4), 511-515 (1978).

K. Mizushima, P.C. Jones, P.J. Wiseman and J.B. Goodenough. "$Li_xCoO_2$: A New Cathode Material for Batteries of High Energy Density", Mater. Res. Bull, 15, 783-799 (1980).

A.K. Padhi, K.S. Nanjundaswamy and J.B. Goodenough. "Phospho-olivines as Positive-Electrode Materials for Rechargeable Lithium Batteries", Journal of the Electrochemical Society, 144 (4), 1188-1194 (1997).

A.K. Padhi, K.S. Nanjundaswamy, C. Masquelier, S. Okada and J.B. Goodenough. "Effect of Structure on the $Fe^{3+}/Fe^{2+}$ Redox Couple in Iron Phosphates", Journal of the Electrochemical Society, 144 (5), 1609-1613 (1997).

I. Plitz, F. Badway, J. Al-Sharab, A. DuPasquier, F. Cosandey and G. G. Amatucci. "Structure and Electrochemistry of Carbon-Metal Fluoride Nanocomposites Fabricated by Solid-State Redox Conversion Reaction", Journal of the Electrochemical Society, 152 (2), A307-A315 (2005).

J.M. Tarascon, E. Wong, F. K. Shokoohi, W.R. McKinnon and S. Colson. "The Spinel Phase of $LiMn_2O_4$ as a Cathode in Secondary Lithium Cells", Journal of Electrochemical Society, 138 (10), 2859-2864 (1991).

M. M. Thackeray, W. I. F. David, P. G. Bruce and J. B. Goodenough. "Lithium Insertion into Manganese Spinels", Mater. Res. Bull. 18, 461-472 (1983).

M.G.S.R. Thomas, W.I.F. David, J.B. Goodenough and P. Groves. "Synthesis and Structural Characterization of the Normal Spinel Li$[Ni_2]O_4$", Mater. Res. Bull. 20, 1137-1146 (1985).

Written Opinion of the International Searching Authority dated Sep. 20, 2007.

International Search Report and Written Opinion dated Nov. 26, 2007.

* cited by examiner

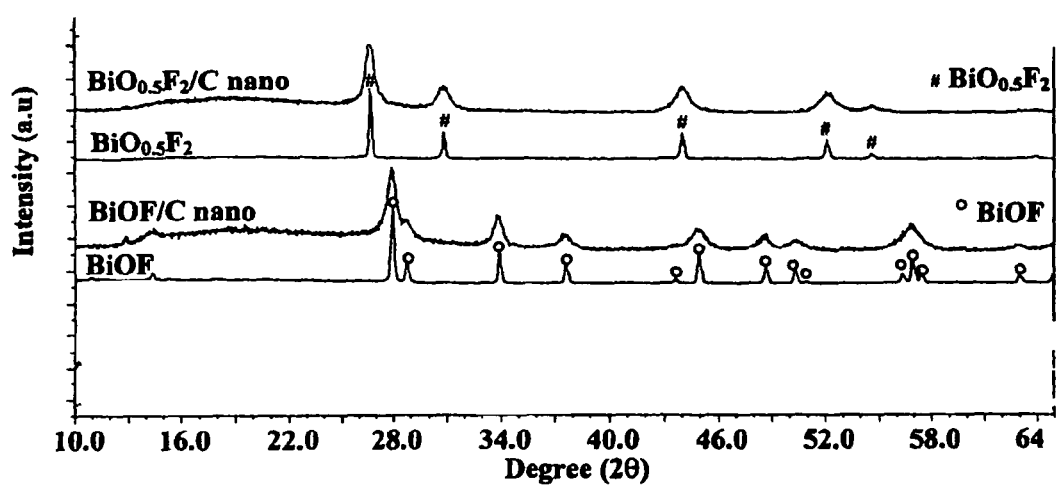
FIG. 1/10

FIG. 2/10
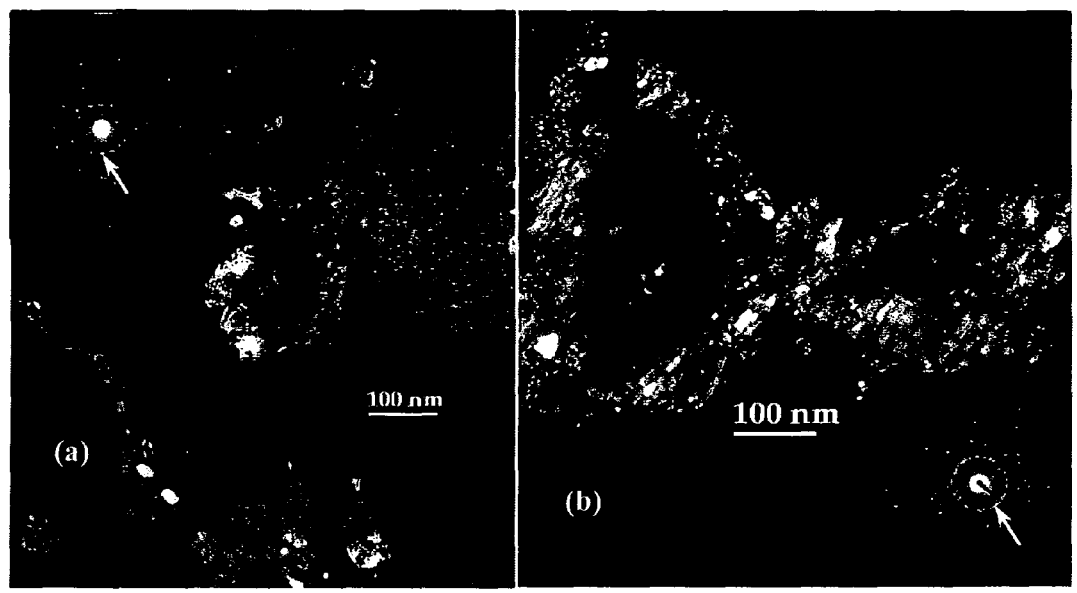

FIG. 3/10
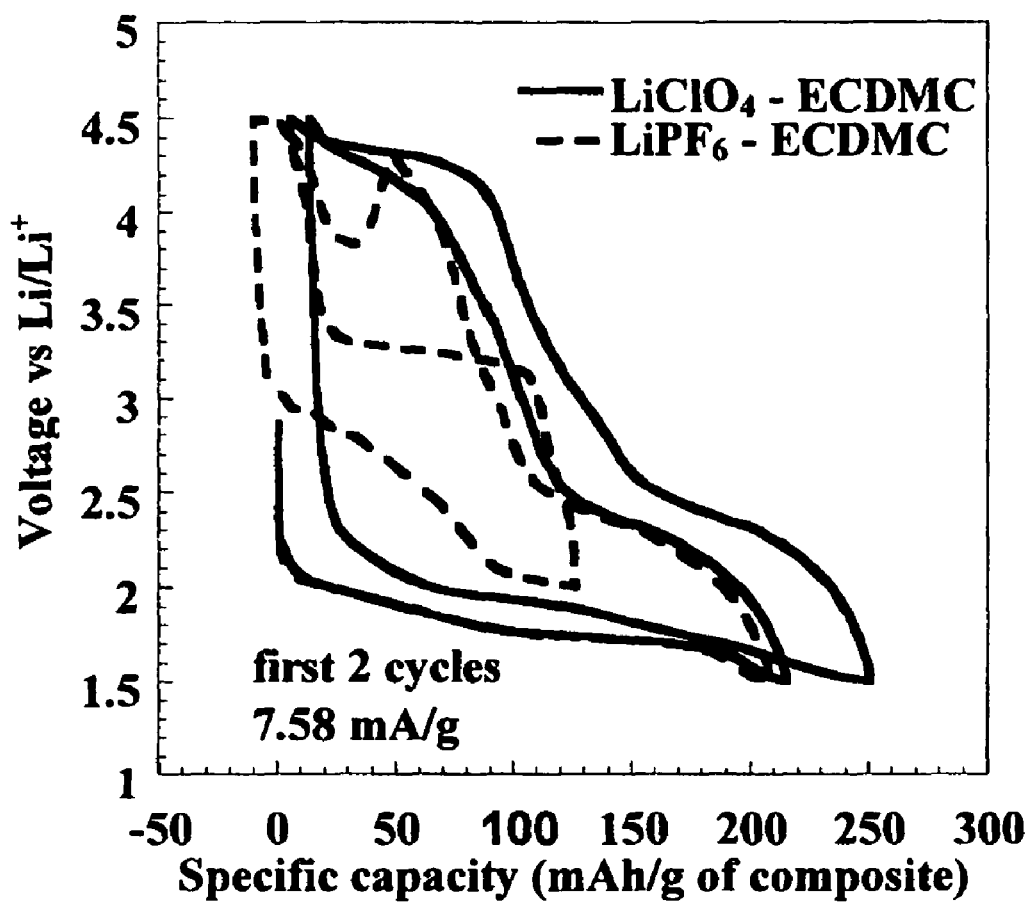

FIG. 4/10
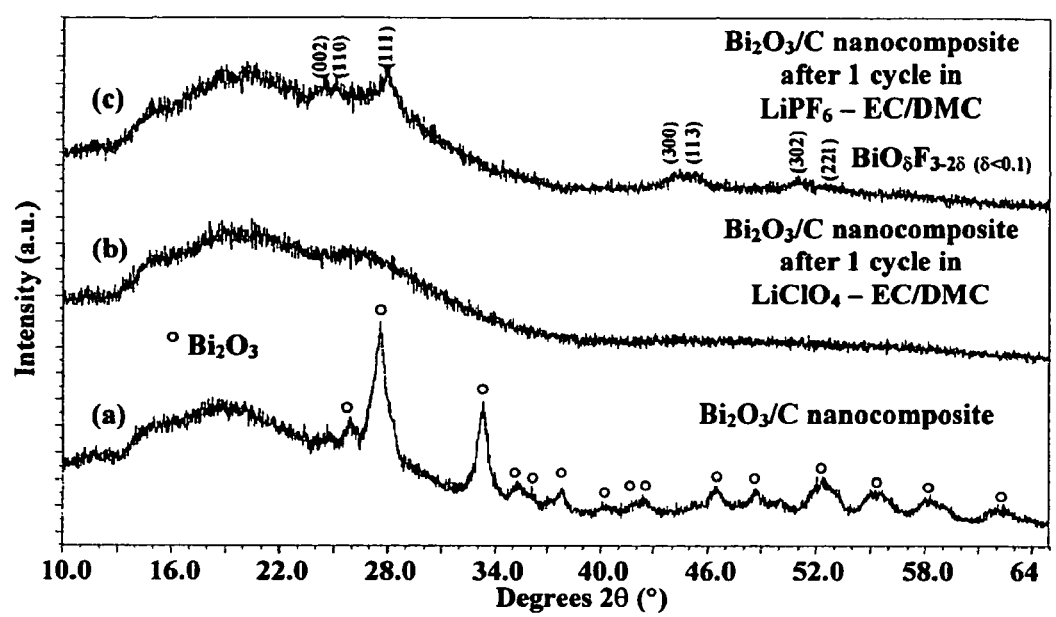

FIG. 5/10
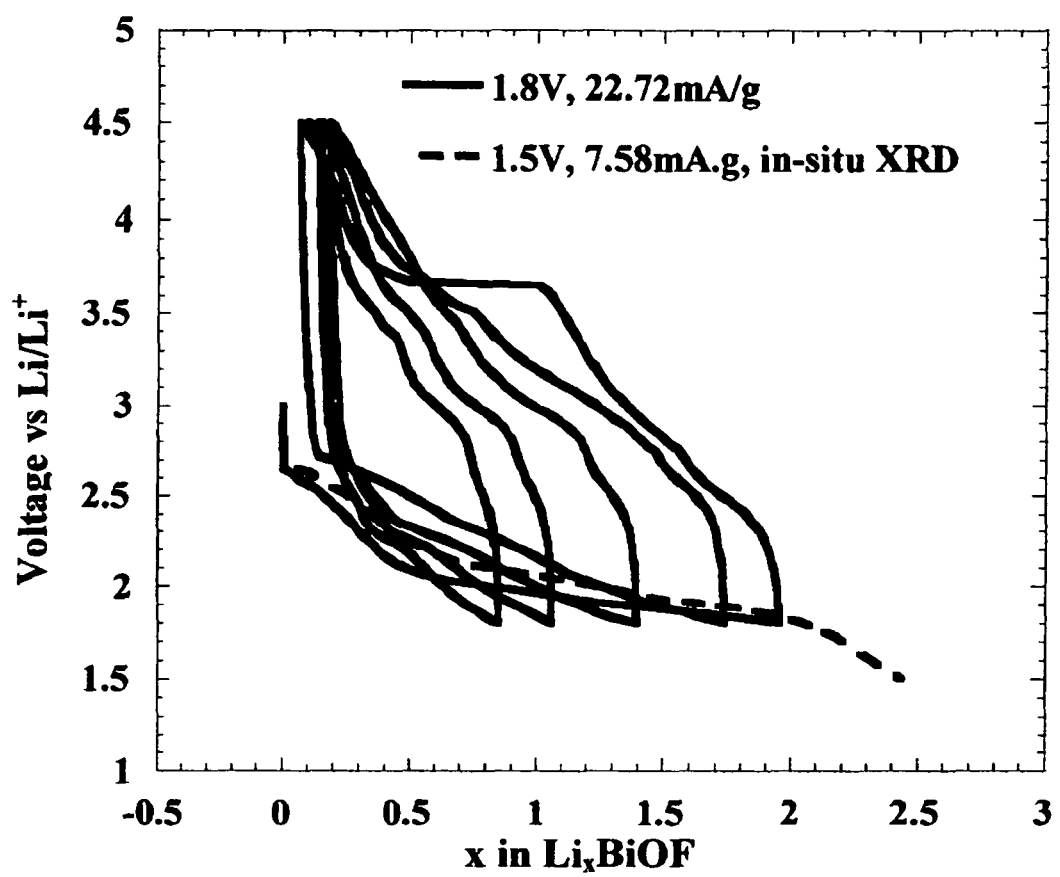

FIG. 6/10
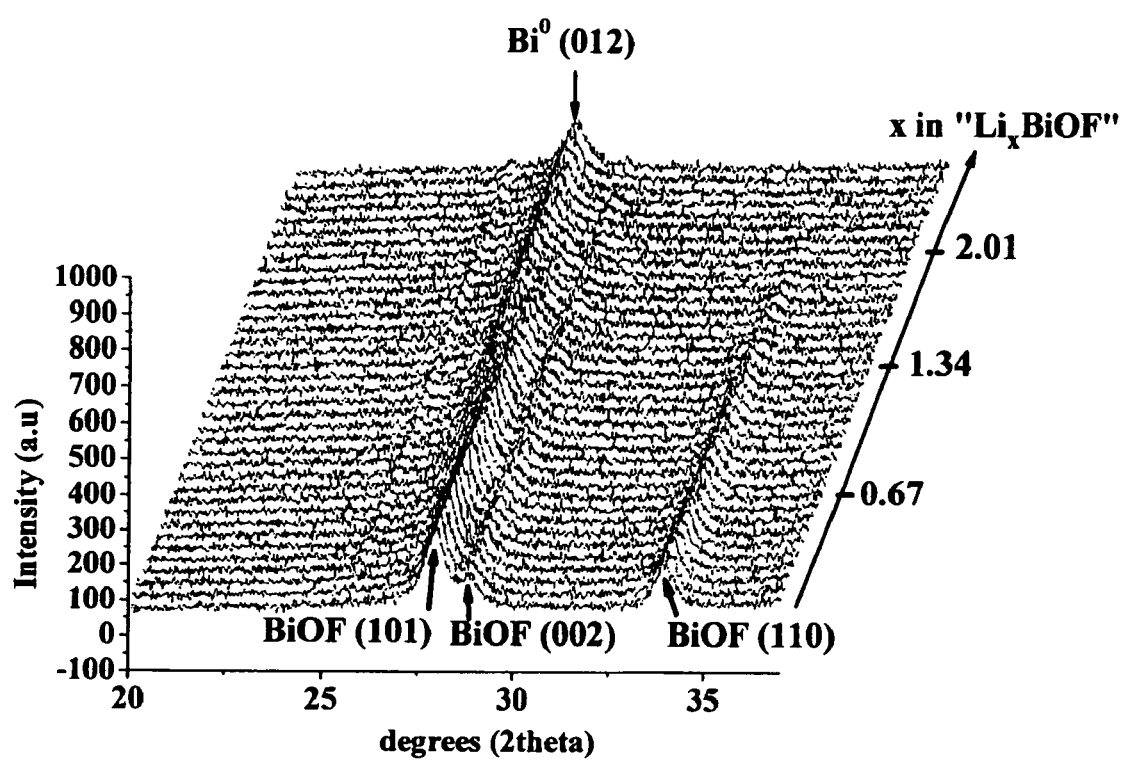

FIG. 7/10
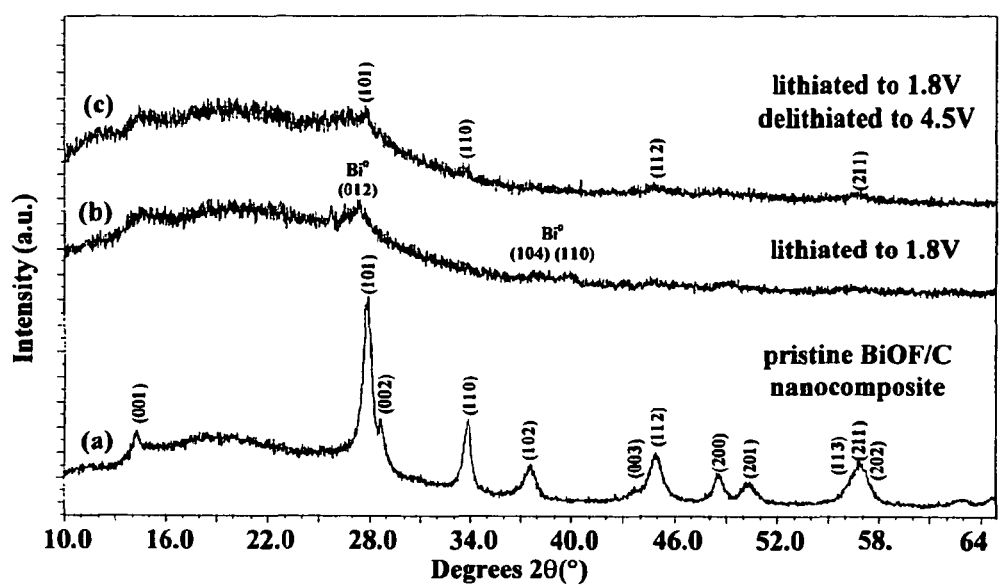

FIG. 8/10
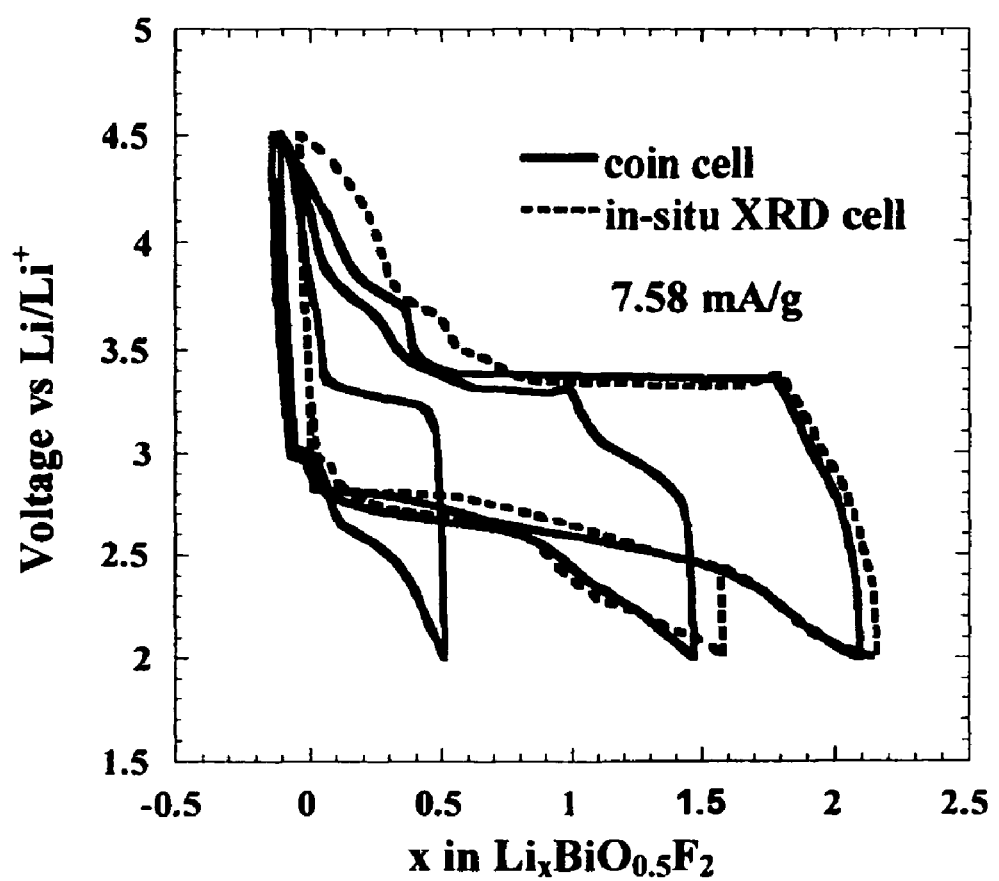

FIG. 9A/10
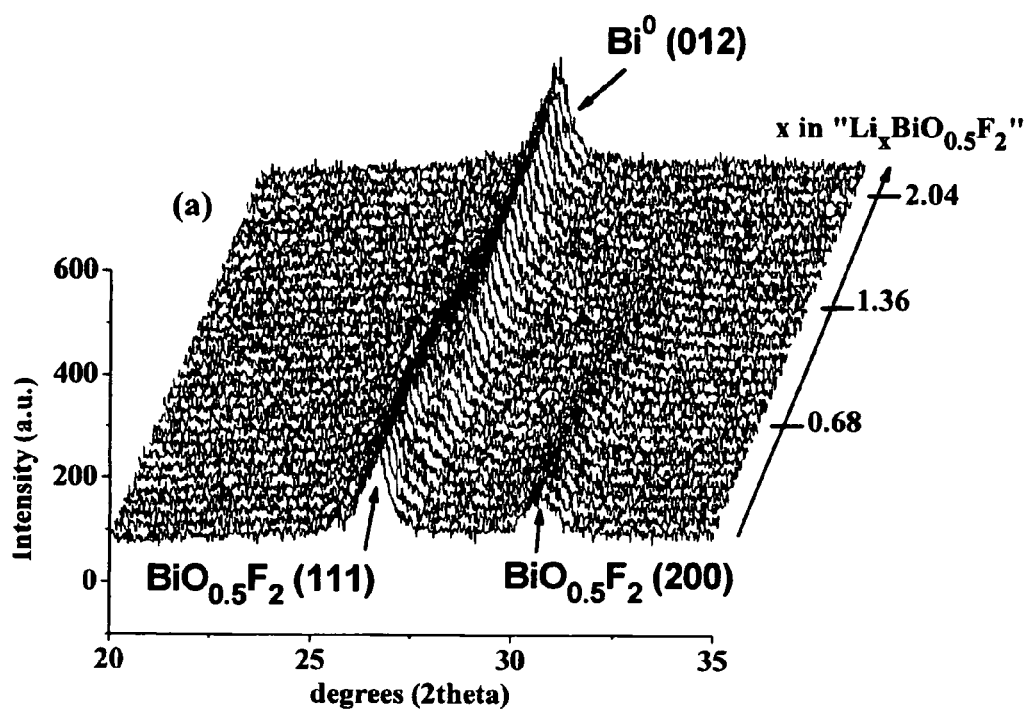

FIG. 9B/10
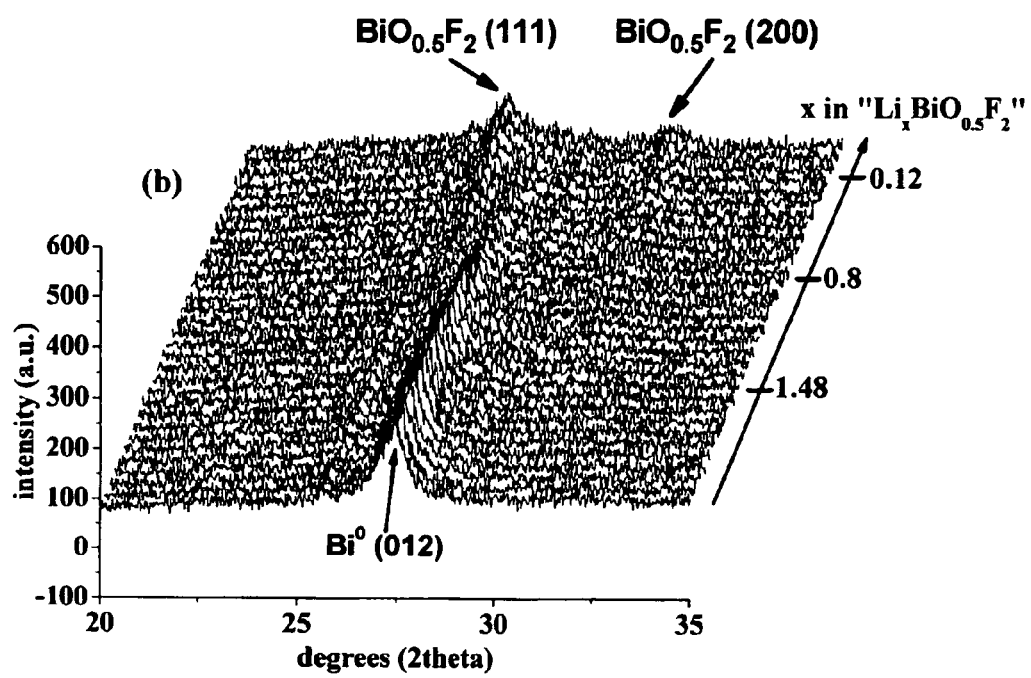

BISMUTH OXYFLUORIDE BASED NANOCOMPOSITES AS ELECTRODE MATERIALS

CROSS REFERENCE TO RELATED APPLICATIONS

This application is a continuation in part of PCT/US2005/35625, entitled "Bismuth Fluoride Based Nanocomposites as Electrode Materials" by Amatucci et al., filed on Sep. 30, 2005, which claims the benefit of priority of U.S. Provisional application No. 60/615,480 filed Oct. 1, 2004. The entire disclosure of each of these applications is incorporated by reference.

GOVERNMENT RIGHTS

This invention was made with federal government support. Consequently, the government has certain rights in the invention.

FIELD OF THE INVENTION

The present invention relates to primary and secondary electrochemical energy storage systems, particularly to such systems as battery cells, which use materials that take up and release ions as a means of storing and supplying electrical energy.

BACKGROUND OF THE INVENTION

The lithium-ion battery cell is the premiere high-energy rechargeable energy storage technology of the present day. Unfortunately, its high performance still falls short of energy density goals in applications ranging from telecommunications to biomedical. Although a number of factors within the cell contribute to this performance parameter, the most crucial ones relate to how much energy can be stored in the electrode materials of the cell.

During the course of development of rechargeable electrochemical cells, such as lithium (Li) and lithium-ion battery cells and the like, numerous materials capable of reversibly accommodating lithium ions have been investigated. Among these, occlusion and intercalation materials, such as carbonaceous compounds, layered transition metal oxide, and three dimensional pathway spinels, have proved to be particularly well-suited to such applications. However, even while performing reasonably well in recycling electrical storage systems of significant capacity, many of these materials exhibit detrimental properties, such as marginal environmental compatibility and safety, which detract from the ultimate acceptability of the rechargeable cells. In addition, some of the more promising materials are available only at costs that limit widespread use. However, of most importance is the fact that the present state of the art materials only have the capability to store relatively low capacity of charge per weight or volume of material (e.g. specific capacity, (mAh/g); gravimetric energy density (Wh/kg$^{-1}$); volumetric energy density, (Wh/l$^{-1}$)).

Materials of choice in the fabrication of rechargeable battery cells, particularly highly desirable and broadly implemented Li-ion cells, for some considerable time have centered upon graphitic negative electrode compositions, which provide respectable capacity levels in the range of 300 mAh/g. Unfortunately, complementary positive electrode materials in present cells use less effective layered intercalation compounds, such as LiCoO$_2$, which generally provide capacities only in the range of 150 mAh/g.

Intercalation compounds are not highly effective because the intercalation process is not an ideal energy storage mechanism. This situation occurs because of the limited number of vacancies available for lithium resulting in a limited utilization of the oxidation states of the host metal. An alternative process, reversible conversion, allows for all of the oxidation states of a compound to be utilized. The reversible conversion reaction proceeds as follows:

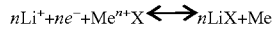

where Me is a metal and X is O$^{-2}$, S$^{2-}$, N$^-$ or F$^-$. This reaction can lead to much higher capacities than can an intercalation reaction and, therefore, to much higher energy densities.

Badway et al. (*Journal of The Electrochemical Society*, 150(9) A1209-A1218 (2003)), for example, has described electrode materials having high specific capacities via a reversible conversion reaction. They reported specific capacities for carbon metal fluoride nanocomposites, such as a carbon FeF$_3$ nanocomposite, active for this reaction, having >90% recovery of its theoretical capacity (>600 mAh/g) in the 4.5-1.5 V region. They attained this major improvement in specific capacity by reducing the particle size of FeF$_3$ to the nanodimension level in combination with highly conductive carbon.

Other metal fluorides are capable of reversible conversion, as well. For example, bismuth metal fluorides, such as BiF$_3$, are capable of reversible conversion according to the following equation:

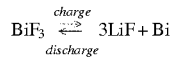

(See, e.g. PCT/US2005/35625, entitled "Bismuth Fluoride Based Nanocomposites as Electrode Materials" by Amatucci et al., filed on Sep. 30, 2005, incorporated herein by reference).

As mentioned above, reversible conversion reactions also have been observed in metal oxides as well as metal fluorides. Because metal fluorides are more ionic than metal oxides, the discharge voltage of a given fluoride compound will always be higher than the discharge voltage of the corresponding oxide, thereby leading to greater specific energies and attractiveness as future positive electrodes materials. Another effect of the higher ionicity of the metal fluorides with respect to the metal oxides is that the generally lower band gap oxides have relatively good electronic conductivity while the high band gap fluorides are electronic insulators. As a direct consequence, it has been shown that the preparation of a metal fluoride/conductive matrix nanocomposite is necessary in order to enable the electrochemical activity of the higher voltage metal fluorides whereas the oxides can be utilized in their macro state.

Bismuth compounds that combine both oxides and fluorides, theoretically, can be an attractive alternative to metal fluorides since they combine the high voltage of the fluorides with the good electronic conductivity of the oxides. However, to date, bismuth oxyfluoride has not been utilized as a positive electrode material in Li-ion battery cells.

Hence, there is a need in the art for electrical energy-storage and delivery systems capable of using bismuth oxyfluorides in order to combine both good electronic conductivity and as well as high voltage capabilities.

SUMMARY OF THE INVENTION

The present invention provides improved materials for battery components, specifically for positive electrodes in primary and rechargeable battery cells. According to one embodiment, a composition of the present invention comprises a nanocrystalline bismuth oxyfluoride compound. According to another embodiment, a composition of the present invention comprises a nanocrystalline bismuth oxyfluoride nanocomposite. According to another embodiment, a composition of the present invention comprises a bismuth oxyfluoride nanocomposite. According to another embodiment, an electrochemical cell of the present invention comprises: a negative electrode; a positive electrode comprising a bismuth oxyfluoride compound nanocomposite; and a separator disposed between the negative and positive electrodes.

BRIEF DESCRIPTION OF THE FIGURES

FIG. 1. XRD patterns before and after high-energy milling in the presence of 15 wt % activated carbon of two bismuth oxyfluoride compounds.

FIG. 2 Dark Field TEM images of a) $Bi_2O_3$ high-energy milled with 15 wt % and (b) $BiO_{0.5}F_2$ high energy milled with 15 wt % carbon SuperP.

FIG. 3. First two cycles of the $Bi_2O_3$/C nanocomposite at 7.57 mA/g current density in $LiClO_4$-EC/DMC and $LiPF_6$-EC/DMC electrolytes.

FIG. 4. Ex-situ XRD patterns of the $Bi_2O_3$/C nanocomposite (a) before cycling and after one cycle between 1.5 V and 4.5 V vs. Li/Li+ at 7.58 mA/g in (b) $LiClO_4$-EC/DMC and (c) $LiPF_6$-EC/DMV. The Bragg reflection on the pattern (c) are characteristic of $BiO_\delta F_{3-2\delta}$ with $\delta<0.1$.

FIG. 5. First five cycles of BiOF/C nanocomposite and galvanostatic curve.

FIG. 6. Ex situ XRD patterns of the BiOF/C nanocomposite.

FIG. 7. Ex-situ XRD patterns of the BiOF/C nanocomposite.

FIG. 8. First 3 cycles of the $BiO_{0.5}F_2$/C nanocomposite and galvanostic curve.

FIG. 9(a) In situ XRD pattern of $BiO_{0.5}F_2$/C nanocomposite during a first lithiation.

FIG. 9(b). In-situ XRD pattern of $BiO_{0.5}F_2$/C nanocomposite during a first delithiation.

DETAILED DESCRIPTION OF THE INVENTION

The present invention provides improved materials for battery components, specifically for positive electrodes in primary and rechargeable battery cells.

In this work, we studied compounds having two different types of anions, namely $O^{2-}$ and $F^-$, to investigate whether or not reversible conversion reactions were possible in such systems. As defined herein, the term "oxyfluoride compounds," which refers to compounds in which both the fluorine and oxygen anions coexist, includes oxyfluoride compounds containing any small amount of fluorine (F) or oxygen (O). In metal oxyfluorides, the progression of the conversion mechanism with respect to the relative formation of $Li_2O$ and LiF during reduction and oxidation reactions is not obvious.

We have focused our attention on the use of the bismuth oxyfluoride system where a wide range of compositions containing $O^{2-}$ and $F^-$ exist with little possibility of intermediate intercalation reactions.

Four compounds in the bismuth oxyfluoride $BiO_xF_{z-2x}$ family were studied, covering a span from pure bismuth oxide ($Bi_2O_3$) to pure bismuth fluorides ($BiF_3$). We have previously demonstrated that the $BiF_3$ end member is an active reversible conversion compound (See PCT/US2005/35625, entitled "Bismuth Fluoride Based Nanocomposites as Electrode Materials" by Amatucci et al., filed on Sep. 30, 2005, and incorporated herein by reference). The two end members, $Bi_2O_3$ and $BiF_3$, were coupled with oxyfluoride intermediates. We were able to demonstrate that novel bismuth oxyfluoride nanocrystalline compounds, as well as other novel embodiments of these compounds, are capable of reversible conversion reactions. Herein, these inventions are provided.

In one embodiment, a composition is provided that includes a nanocrystalline bismuth oxyfluoride compound. The phrase "bismuth oxyfluoride compound" includes any compound that comprises the elements of bismuth (Bi), oxygen (O) and fluorine (F). Examples of bismuth oxyfluoride compounds include, but are not limited to, BiOF.

As used herein, "nanocrystalline size" or "nanocrystalline" are used interchangeably and refer to crystallites of about 100 nm or less. As is well known in the art, crystallite size may be determined by common methodologies such as peak breadth analysis in X-ray diffraction (XRD) and high resolution transmission electron microscopy (HRTEM).

In a preferred embodiment, the bismuth oxyfluoride compound of nanocrystalline size includes a bismuth oxyfluoride compound wherein bismuth has an ionic charge of $Bi^{5+}$. In another preferred embodiment, the bismuth has an ionic charge of $Bi^{3+}$.

Preferably, the bismuth oxyfluoride compound of nanocrystalline size includes a bismuth oxyfluoride compound having the formula $BiO_xF_{z-2x}$, wherein $0<x<1.5$ and $3\leq z\leq 5$. Even more preferably, the Bi cation in $BiO_xF_{z-2x}$, wherein $0<x<1.5$ and $3\leq z\leq 5$, has a charge of $Bi^{5+}$.

In another preferred embodiment, the bismuth oxyfluoride compound of nanocrystalline size includes BiOF. In yet another preferred embodiment, the bismuth oxyfluoride compound of nanocrystalline size includes $BiO_{0.5}F_2$.

In another embodiment, the charge of the bismuth cation in a bismuth oxyfluoride compound may be partially substituted with a metal cation. As used herein "partial substitution" refers to a condition where an alternative cation is placed within the atomic crystal structure of the bismuth compound. Charge compensation can be made by a change in charge of the Bi cation or change in anion content such as loss of $F^-$ or gain of $O^{2-}$.

Suitable metal elements having charges that may be included in the inventive crystalline bismuth oxyfluoride compound that can partially substitute the charge of a bismuth cation include, but are not limited to, non-transition metals and transition metals, preferably transition metals, and more preferably first row transition metals. Specific examples of metals for use in the inventive composition include, but are not limited to, Fe, B, Co, Ni, Mn, V, Mo, Pb, Sb, Cu, Sn, Nb, Cr, Ag, and Zn. Preferably, Mo or Cu are included. It is desirable, but not required, that such compounds retain both electrical and ionic conductivity.

As used herein, "elements" refers to simple substances which cannot be resolved into simpler substances by normal chemical means.

While theoretically the electrochemical performance of the materials of the present invention could be improved with the use of discrete nanoparticles, it is not preferred due to a decrease in packing density and surface area contact with the liquid electrolyte. Consequently, the present invention also provides a composition including a nanocrystalline bismuth oxyfluoride compound nanocomposite. The phrase "nanocrystalline bismuth oxyfluoride compound nanocomposite" as used herein means nanocrystallites comprising at least a bismuth oxyfluoride compound incorporated within a matrix.

In one embodiment, the matrix is composed of particles or crystallites of a nanocrystalline size.

In another embodiment, the matrix is composed of particles of macrodimensional size. As used herein, "macrodimensional size" or "microcrystalline size" are used interchangeably and refer to particles greater than 100 nm.

Nonconductive matrices are not preferred, but can include the oxides of boron, silicon, and metal fluorides. In a preferred embodiment, the matrix is a conductive matrix. As used herein, the term "conductive matrix" refers to a matrix that includes conductive materials, some of which may be ionic and/or electronic conductors. Preferably, the matrix will retain both ionic and electronic conductivity; such materials are commonly referred to as "mixed conductors."

In one embodiment, the conductive matrix is carbon. Preferably, less than 50 weight % of carbon is used. More preferably, less than 25 weight % carbon is used. Even more preferably less than 5 weight % carbon is used. In another embodiment, the conductive matrix is a metal sulfide. In a further embodiment, the conductive matrix is a metal nitride. Preferably, the conductive matrix is a metal oxide. In another preferred embodiment, the conductive matrix is a metal fluoride. In yet, still another preferred embodiment, the conductive matrix is a metal oxyfluoride. Preferably, the metal from the metal oxide, metal fluoride or the metal oxyfluoride is Fe, B, Bi, Co, Ni, Mn, V, Mo, Pb, Sb, Cu, Sn, Nb, Cr, Ag or Zn.

Suitable metal sulfide conductive matrices include, but are not limited to, molybdenum sulfides, molybdenum oxysulfides, and titanium sulfide. Suitable metal nitride conductive matrices include, but are not limited to, copper nitride, molybdenum nitride, and titanium nitride. Suitable metal oxide conductive matrices include, but are not limited to, $VO_2$, $MoO_2$, NiO, $V_2O_5$, $V_6O_{13}$, CuO, $MnO_2$, chromium oxides and $MoO_3$. Suitable metal fluoride conductive matrices include, but are not limited to $MoF_3$, $MoF_4$, $Ag_2F$. Suitable metal oxyfluoride conductive matrices include, but are not limited to, $MoO_xF_z$, wherein x is $0 \leq x \leq 3$ and z is $0 \leq z \leq 5$ and combined in such a way that the effective charge on the Mo cation is not more than 6+. Preferably, the conductive matrix is $MoO_3$.

In a preferred embodiment, the conductive matrix is present in an amount that is less than about 50 weight % of the nanocomposite.

In yet another embodiment, the nanocrystalline bismuth oxyfluoride compound of the inventive nanocomposite includes carbon. Preferably, less than 50 weight % of carbon is used. More preferably, less than 25 weight % carbon is used. Even more preferably less than 5 weight % carbon is used.

In another embodiment, the nanocrystalline bismuth fluoride compound of the inventive nanocomposite includes crystallites that are less than about 100 nm in diameter; preferably, less than about 50 nm in diameter; and even more preferably less than about 20 nm in diameter.

The nanocrystalline bismuth oxyfluoride compound of the inventive nanocomposite preferably includes $Bi^{5+}$ or $Bi^{3+}$ as described above. Even more preferably, the compound of the inventive nanocomposite is $BiO_xF_{z-2x}$, wherein $0<x<1.5$ and $3 \leq z \leq 5$. Yet, even more preferably, $BiO_xF_{z-2x}$, wherein $0<x<1.5$ and $3 \leq z \leq 5$ is BiOF or $BiO_{0.5}F_2$. Furthermore, the bismuth oxyfluoride compound of the nanocomposite can include a Bi cation wherein a metal cation is in partial substitution of the Bi cation as described above.

In another embodiment, the specific capacity of the nanocrystalline bismuth oxyfluoride nanocomposite is reversible. As used herein, the term "specific capacity" refers to the amount of energy the bismuth oxyfluoride compound nanocomposite contains in milliamp hours (mAh) per unit weight. The term "reversible specific capacity" as used herein means that the nanocomposite of the present invention may be recharged by passing a current through it in a direction opposite to that of discharge.

In another embodiment, the nanocrystalline bismuth oxyfluoride compound of the inventive nanocomposites demonstrates a conversion reaction. As used herein, the term "conversion reactions" refers to decomposition reactions in which the bismuth oxyfluoride compound of the nanocomposites of the present invention are fully reduced during battery cell discharge to $Bi^0$ with the concomitant formation of a lithium, magnesium or calcium compound.

Preferably, the nanocrystalline bismuth oxyfluoride compound of the nanocomposite of the invention is $BiO_{0.5}F_2$ and is capable of a conversion reaction. Without being limited by theory, the chemical equation for the conversion reaction corresponds to the following chemical reaction taking place in two steps:

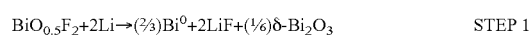

$BiO_{0.5}F_2 + 2Li \rightarrow (\tfrac{2}{3})Bi^0 + 2LiF + (\tfrac{1}{6})\delta\text{-}Bi_2O_3$   STEP 1

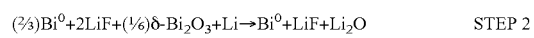

$(\tfrac{2}{3})Bi^0 + 2LiF + (\tfrac{1}{6})\delta\text{-}Bi_2O_3 + Li \rightarrow Bi^0 + LiF + Li_2O$   STEP 2 where $Bi_2O_3$ is an intermediate oxide form.

In another preferred embodiment, the nanocrystalline bismuth oxyfluoride compound of the nanocomposite of the invention is BiOF and is capable of a conversion reaction. Without being limited by theory, the chemical equation for the conversion reaction corresponds to the following chemical reaction taking place in two steps:

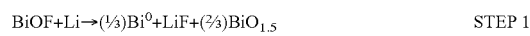

$BiOF + Li \rightarrow (\tfrac{1}{3})Bi^0 + LiF + (\tfrac{2}{3})BiO_{1.5}$   STEP 1

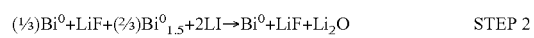

$(\tfrac{1}{3})Bi^0 + LiF + (\tfrac{2}{3})BiO_{1.5} + 2Li \rightarrow Bi^0 + LiF + Li_2O$   STEP 2

In another embodiment, the conversion reaction of the bismuth oxyfluoride compound nanocomposite of the present invention is reversible. As used herein, the term "reversible conversion reactions" refers to reactions in which the nanocrystalline bismuth fluoride compound of the nanocomposite of the present invention is capable of reforming during a battery cell charge.

Preferably, the nanocrystalline bismuth fluoride compound of the nanocomposite of the present invention that is capable of a reversible conversion reaction is $BiO_{0.5}F_2$. Without being limited by theory, in this embodiment, the chemical equation for the reversible conversion reaction is

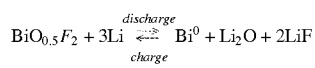

$$BiO_{0.5}F_2 + 3Li \underset{\text{charge}}{\overset{\text{discharge}}{\rightleftarrows}} Bi^0 + Li_2O + 2LiF$$

In another preferred embodiment, the nanocrystalline bismuth oxyfluoride compound of the inventive nanocomposite capable of reversible conversion is BiOF. Without being limited by theory, the corresponding chemical equation is:

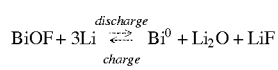

$$BiOF + 3Li \underset{\text{charge}}{\overset{\text{discharge}}{\rightleftarrows}} Bi^0 + Li_2O + LiF$$

The inventive nanocomposites may be prepared by extreme, high impact-energy milling of a mixture that includes a bismuth oxyfluoride compound and, optionally, a conductive matrix such as $MoO_3$ and/or carbon. Thus, the nanocrystalline bismuth oxyfluoride compound nanocomposite of the present invention can be prepared by using an impact mixer/mill such as the commercially available SPEX 8000 device (SPEX Industries, Edison N.J., USA). Unlike the shearing action of conventional planetary, roller, or ball mills, which at best may allow for size reduction of crystallite particles to the micrometer range, the extremely high-energy impact action impressed upon the component mixture by the impact mill provides, within milling periods as short as about 10 minutes, a particle size reduction of the processed material to the nanodimensional range of less than about 100 nm. Further milling for as little as 30 minutes, up to about 4 hours, brings about crystallite-particle size reduction to less than about 40 nm.

Other methods may be used to form the nanocomposites of the present invention. As will be evident to a skilled artisan, solution or gel techniques may be used to fabricate the nanocomposites.

When bismuth oxyfluoride is milled with another component, the bismuth oxyfluoride undergoes chemical changes such that its X ray diffraction characteristics take on the character of a new, highly electrochemically active material, although retaining major aspects of the bismuth oxyfluoride. In addition, the nanocrystallite formation can be easily characterized by well known methods such as Bragg peak broadening in x-ray diffraction and microscopy by methods such as transmission electron microscopy.

In one embodiment, milling occurs for about one hour to obtain nanocrystalline bismuth oxyfluoride compounds. Preferably, the milling results in bismuth oxyfluoride crystallites that are nanostructured in a matrix. Even more preferably, the matrix is conductive. In this form, surface area contact with an electrolyte is less than that of typical discrete nanoparticles, which can result in improved cycle life performance. To enhance the size and density of the nanocomposites without affecting nanocrystallinity, brief thermal annealing maybe utilized or the sintering aids such as glass fluxes.

In another aspect of the present invention, a composition including a bismuth oxyfluoride compound nanocomposite is provided. In one embodiment of this aspect of the invention, the inventive nanocomposite is comprised of a nanocrystalline bismuth oxyfluoride compound in a matrix. In another embodiment, the inventive composite is comprised of a bismuth oxyfluoride compound of nanocrystalline particles in a nanocrystalline matrix. In another embodiment, the inventive nanocomposite comprises a bismuth oxyfluoride compound in a nanocrystalline matrix.

In another aspect of the present invention, an electrochemical cell, preferably a primary or, more preferably, a rechargeable battery cell, is provided, which employs the inventive bismuth oxyfluoride compound nanocomposites or the nanocrystalline bismuth oxyfluoride nanocomposites of the present invention as described herein as the cathode material. The cell may be prepared by any known method. The inventive nanocomposite electrode (cathode) materials function well with most other known primary or secondary cell composition components, including polymeric matrices and adjunct compounds, as well as with commonly used separator.

Traditional electrolyte salts such as LiPF6, LiBF4 and $LiClO_4$ may be used. However, for high oxygen content bismuth oxyfluorides, it is preferred to use salts such as $LiClO_4$ that do not hydrolytically form HF. $LiClO_4$, dissolved in common cyclic and acyclic organic solvents, such as ethylene carbonate, dimethyl carbonate, propylene carbonate, ethyl methyl carbonate, and mixtures thereof, are even more preferable. Yet, even more preferably, $LiClO_4$ in is used with the inventive cathodes in a mixture of ethylene carbonate (EC)/ dimethyl carbonate (DMC) solvents at 0.4 M, (1:1 ratio by volume).

In addition, the inventive nanocomposites may be incorporated into solid state polymer cells utilizing solid state ionically conducting matrices derived from compounds such as polyethylene oxide (PEO). Nanocomposites also may be fabricated by thin film deposition techniques and may be incorporated into solid state thin film lithium batteries utilizing a glassy electrolyte. Finally, such electrode materials may be incorporated into cells utilizing ionic liquid solvents as the electrolytes.

Likewise, the negative electrode members of electrochemical cells may advantageously include any of the widely used known ion sources such as lithium metal and lithium alloys, such as those comprised of lithium tin, lithium silicon, lithium aluminum, lithiated carbons such as those based on coke, hard carbon, graphite, nanotubes or $C_{60}$, and lithiated metal nitrides.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and described the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Preparation of the Nanocrystalline Bismuth Oxyfluoride Compounds of the Invention $Bi_2O_3$ (Aldrich) was obtained commercially from available sources. BiOF and $Bi_{0.5}F_2$ were synthesized via the fluorination of $Bi_2O_3$ by a saturated aqueous $NH_4F$ solution according to the method provided in M. Bervas, B. Yakshinsky, L. C. Klein and G. G. Amatucci, "Soft-Chemistry Synthesis and Characterization of Bismuth Oxyfluorides and Ammonium Bismuth Fluorides", J. American Ceramic Society, (2005), incorporated herein by reference. $BiO_xF_{z-2x}/C$ (wherein $0<x<1.5$ and $3 \leq z \leq 5$) nanocomposites were prepared by high-energy milling for one hour in a Spex 8000 mill 85 wt % $BiO_xF_{z-2x}/C$ wherein $0<x<1.5$ and $3 \leq z \leq 5$ with 15 wt % of either carbon black (Super P (MMM)) or activated carbon (Asupra (Norit)). The high-energy milling cell, as well as the balls, were hardened steel. The high-energy milling cell was sealed and reopened inside a He filled glovebox at $-80°$ C. dew point, thus isolating the powder from moisture or oxygen contamination.

The $BiO_xF_{z-2x}/C$ macrocomposites, (wherein $0<x<1.5$ and $3 \leq z \leq 5$), were prepared by manually mixing 85 wt % of macro $BiO_xF_{z-2x}/C$ (wherein $0<x<1.5$ and $3 \leq z \leq 5$), and 15 wt % of carbon Super P with an agate mortar and pestle.

Example 2

Electrode Preparation

Electrodes were fabricated by utilizing acetone based slurry containing the active material, a poly(vinylidene fluoride-co-hexafluoropropylene) (Kynar 2801, Elf Atochem)) binder, carbon black (super P, MMM) and dibutyl phtalate (Aldrich) plasticizer in the ratio 39/21/8/32. The slurry was then tape casted. Once dried, the freestanding tape was placed in 99.8% anhydrous ether (Aldrich) to extract the dibutyl phtalate (DBP). After DBP extraction, the active material loading of the tape was 57+/−%. Discs of about 1 $cm^2$ punched from these tapes were tested in coin cells against lithium metal (Johnson Matthey). The data presented herein were obtained at a controlled temperature. The battery cycler was either an Arbin or a Mac Pil (Biologic) and all cells were cycled under constant current. The electrolyte was composed of $LiClO_4$ in EC/DMC at 0.4 M (1:1 ratio by volume).

Example 3

Physical Characterization of bismuthoxyfluoride Nanocomposites

In order to characterize the structure of the inventive bismuth oxyfluoride nanocomposites, XRD analyses were performed on a Sintag X2 using Cu Kα radiation. Inventive nanocomposites to be analyzed ex-situ were placed on glass slides and covered with a Kapton film sealed with silicon based vacuum grease inside a glove box to minimize air exposure. For in-situ XRD analysis, the electrode was placed in an in-situ cell. An isolated beryllium window was placed on top of the working electrode to isolate it from the atmosphere while allowing the x-rays to penetrate with minimal loss due to x-ray absorption.

In order to assess the nanocrystalline nature of the material, TEM analysis was performed. Bright Field (BF), Dark Field (DF) and Selected Area Electron Diffraction (SAED) images were taken with a Topcon 002B Transmission Electron Microscope (TEM). For that purpose, the powder samples first were dispersed in anhydrous dimethyl carbonate (DMC), a few drops of which then were disposed on a lacey carbon grid and allowed to dry overnight inside the glove box. The grids to be analyzed were placed in polylaminate bag sealed inside the glovebox, which was reopened only to put the grid in the TEM column, thereby minimizing exposure to the atmosphere to a few seconds. The SAED patterns were interpreted using the Process Diffraction software.

The XRD patterns of the pristine macro BiOF powder, the pristine macro $BiO_{0.5}F_2$, and BiOF and $BiO_{0.5}F_2$ high-energy milled in He in the presence of 15 wt % of carbon Super P for 1 h are shown on FIG. 1. All of the materials retain their original crystalline phase during the milling process.

XRD results reveal a significant broadening of the Bragg reflections of the two inventive nanocomposites in comparison to the pristine bismuth oxyfluoride compounds. This broadening is brought about by high-energy milling. Peak breadth may develop when a drastic reduction in crystallite size (<100 nm) occurs. It can be concluded that the inventive composites are composed of nanocrystallites with an average active material crystallite size ranging from about 31 to about 36 nm, with an average active material crystallite size of about 35 nm.

Dark Field images from the TEM analysis for $BiO_3$ and $BiO_{0.5}F_2$, high-energy milled for 1 hour with 15 wt % carbon are presented on FIG. 2. The particle sizes appear to be widely distributed, ranging from less than about 10 nm to about 35 nm.

Example 4

Some Electrolytes are Incompatible with Bismuth Compounds Containing Oxygen

Electrolyte incompatibilities were identified for the bismuth compound nanocomposites containing oxides. This occurrence is illustrated in FIG. 3. This figure shows the first two cycles of a $Bi_2O_3/C$ nanocomposite (derived as described in Example 3) cycled in $LiPF_6$ EC:DMC [1:1 ratio by volume] and $LiClO_4$ EC:DMC. The two cells behave similarly until the end of the first charge. At the end of the charge, the voltage of the cell cycled in the $LiClO_4$ EC:DMC electrolyte remains constant at 4.3 V for about 80 mAh/g, whereas the voltage of the $LiPF_6$ based cell drops sharply to 3.8 V immediately after reaching 4.3 V and then rises again to 4.5 V. Such reactions may be deemed desirable depending on the application. For example, this type of reaction provides an opportunity to form bismuth fluoride in-situ by an in situ reaction with electrolyte salts.

The ex-situ XRD patterns taken at the end of the first cycle at 4.5 V in those two different electrolytes are shown on FIG. 4. The pattern of the cell cycled in $LiClO_4$ EC:DMC is completely featureless except for an exceptionally broad peak around 26° C. In contrast, a Tysonite phase clearly can be identified on the pattern of the cell cycled in $LiPF_6$ EC:DMC despite the broadness of the peaks. The bismuth compound present is highly fluorinated, which implies that the $LiPF_6$ EC:DMC electrolyte is somehow involved in the chemical reaction at the end of the charge. A $LiPF_6$ based electrolyte always contains a small amount of HF due to its inherent instability. Therefore, it may be HF rather than the $LiPF_6$ salt itself that induces the fluorination of the bismuth. Without being limited by theory, because the voltage profiles in both the $LiPF_6$ EC:DMC and $LiCl_4$ EC:DMC electrolytes resemble one another closely until 4.3 V vs. Li+/Li+, the data suggest that $Bi^0$ is reconverting to $Bi_2O_3$ and that the newly reformed, highly nanocrystalline, $Bi_2O_3$, rather than $Bi^0$ itself, is fluorinated at a high voltage in the $LiPF_6$ EC:DMC electrolyte. Therefore, $Bi_2O_3$, theoretically, could be fluorinated via a standard acid base reaction with HF in which there is no net oxidation according to the following formula:

$$Bi_2O_3 + (6-4\delta)HF \rightarrow 2BiO_\delta F_{3-2\delta} + (3-2\delta)H_2O$$

The formation of this fluoride phase brings about a new feature starting at 3V on the second discharge of the cell cycled in LiPF$_6$ EC:DMC that corresponds to the conversion reaction of BiF$_3$ to Bi+3LiF. Due to the high ionicity of the fluoride bond compared to the oxide bond, the reduction of fluorite compounds occurs at higher voltage than the reduction of their oxide counterparts. The plateau at 3.3V on the following charge is due to the reconversion reaction of the fluoride phase to BiF$_3$. None of these features is present on the second cycle of the cell cycled with the LiClO$_4$ salt. This behavior demonstrates that, in this system, the LiPF$_6$ electrolyte salt products are prone to react with bismuth compounds and, thus, can participate in the electrochemical reactions occurring in the cell. To avoid this reaction, LiPF$_6$ salt is not used with bismuth compounds containing oxides including bismuth oxyfluorides. A LiClO$_4$-EC:DMC [1:1 ratio by volume] electrolyte is the preferred electrolyte.

Example 5

BiO$_x$F$_{z-2x}$/C Nanocomposites are Capable of Reversible Conversion Reactions a. BiOF The conversion reaction occurring in the BiOF/C nanocomposite during lithiation is demonstrated in FIG. 6 by means of an in-situ XRD. The galvanostatic curve obtained during that in-situ run is presented on FIG. 5. The XRD patterns of FIG. 6 reveal a progressive increase of the Bi$^0$ Bragg reflections and a progressive decrease of the BiOF reflections. The absence of shift in the BiOF peaks indicates that no lithium intercalation reaction occurs in the nanocomposite and that the conversion reaction starts from the beginning of the lithiation. Li$_2$O and LiF reflections cannot be seen on this XRD pattern due to their very small crystallite size and due to the very low x-ray scattering factor of Li, O and F with respect to Bi.

The galvanostatic curve of FIG. 5 indicates that the conversion reaction is reversible. To verify whether the observed capacity during delithiation was coming from the oxidation of Bi$^0$, LiF and Li$_2$O resulting in BiOF or was comprised of a two phase composite of Bi$_2$O$_3$+BiF$_3$, an ex-situ XRD analysis on the BiOF/C nanocomposite during charge was conducted. The ex-situ XRD patterns of the BiOF/C in its initial state, lithiated to 1.8 V and, after one cycle, between 1.8V and 4.5V, are presented on FIG. 6. The coin cells used for these patterns were cycled at a current density of 22.72 mA/g. On both patterns, all the peaks are very broad, consistent with the very fine nanocomposite known to occur during lithiation. Nonetheless, it is readily apparent that all the peaks on the pattern obtained at the end of the lithiation are characteristic of Bi metal and all the peaks on the pattern obtained at 4.5 V are characteristic of BiOF. This proves that Bi$^0$ has formed during the lithiation and that it has been oxidized during the delithiation. The BiOF (101) and the Bi$^0$ (012) reflections, which are the most intense reflections of the compounds, have almost exactly the same position and are difficult to differentiate. The BiOF (110) reflection, on the contrary, is well separated from any Bi$^0$ reflection and a peak at that position can only come from BiOF. Therefore, a conversion reaction occurring in BiOF is reversible and BiOF, rather than a combination of Bi$_2$O$_3$ and BiF$_3$, reforms during charge. Without being limited by theory, the reversible conversion reaction is written as follows:

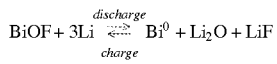

$$\text{BiOF} + 3\text{Li} \underset{\text{charge}}{\overset{\text{discharge}}{\rightleftarrows}} \text{Bi}^0 + \text{Li}_2\text{O} + \text{LiF}$$

b. BiO$_{0.5}$F$_2$

The XRD patterns presented on FIGS. 8(a) and 8(b) were collected during an in-situ XRD analysis of the BiO$_{0.5}$F$_2$/C nanocomposite cycled at a current density of 7.58 mA/g between 2 V and 4.5 V. The corresponding galvanostatic curve is presented on FIG. 7. BiO$_{0.5}$F$_2$ Bragg reflections progressively disappear with x from the patterns of the nanocomposite during the first lithiation (FIG. 13a) and completely vanish around x=1.43. As can be seen on the galvanostatic curve, this is almost precisely the x value at the end of the first lithiation plateau. It would seem, therefore, that the occurrence of a first and a second plateau during the lithiation is a pure kinetic effect, which stems from a polarization increase when the lithiation product becomes the dominant component of the nanocomposite. Bi$^0$ reflections begin to appear very early on in the lithiation, at x=0.27. These Bi$^0$ reflections, in conjunction with the absence of shift of the BiO$_{0.5}$F$_2$ peaks, indicate that a conversion reaction starts at the very beginning of the lithiation, without any prior lithium intercalation reaction.

The patterns collected during the delithiation are presented on FIG. 8(b). The BiO$_{0.5}$F$_2$ Bragg's reflections begin to reappear on the XRD patterns around x=1.2. From the relative intensity of the most intense Bi$^0$ and BiO$_{0.5}$F$_2$ peak, it can be inferred that BiO$_{0.5}$F$_2$ again becomes the dominant phase in the material at around x=0.8. This value matches the value around which the output voltage starts to increase sharply on the galvanostatic curve of FIG. 7. Hence, the reformation of BiO$_{0.5}$F$_2$ seems to cause a sudden polarization increase in the cell. Bi$^0$ peaks can be seen until about x=0.32. At 4.5 V the nanocomposite has fully returned to its prelithiated state, although the BiO$_{0.5}$F$_2$ Bragg's reflections are broader than in the pristine material, perhaps, due to a smaller crystallite size. Without being limited by theory, the reversible conversion reaction is as follows:

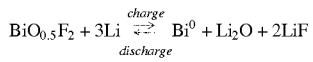

$$\text{BiO}_{0.5}\text{F}_2 + 3\text{Li} \underset{\text{discharge}}{\overset{\text{charge}}{\rightleftarrows}} \text{Bi}^0 + \text{Li}_2\text{O} + 2\text{LiF}$$

Without being limited by theory, the two-step conversion reaction in both the lithiation and delithiation reaction occurs due to the difference in the theoretical reduction reaction of bismuth oxide conversion, which is of lower voltage than the corresponding bismuth fluoride reaction.

While the present invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

What is claimed is:

1. An electrode composition for an energy storage electrochemical cell comprising a nanocrystalline bismuth oxyfluoride compound, wherein the electrode composition is capable of being cycled between about 2 volts and about 4.5 volts relative to a Li/Li+ reference potential.

2. The composition according to claim 1, wherein the bismuth oxyfluoride compound comprises $BiO_xF_{z-2x}$, and wherein $0<x<1.5$ and $3 \leq z \leq 5$.

3. The composition according to claim 1, wherein the bismuth oxyfluoride compound is BiOF.

4. The composition according to claim 1, wherein the bismuth oxyfluoride compound is $BiO_{0.5}F_2$.

5. The composition according to claim 1, wherein the bismuth oxyfluoride compound is comprised of $Bi^{5+}$.

6. The composition according to claim 2, wherein the bismuth oxyfluoride compound is comprised of $Bi^{5+}$.

7. The composition according to claim 1, wherein the bismuth oxyfluoride compound is comprised of $Bi^{3+}$.

8. The composition according to claim 1, wherein the bismuth oxyfluoride compound further comprises a metal cation in partial substitution of the Bi cation.

9. The composition according to claim 8, wherein the metal cation is a metal element selected from the group consisting essentially of Fe, B, Co, Ni, Mn, V, Mo, Pb, Sb, Cu, Sn, Nb, Cr, Ag and Zn.

10. The composition according to claim 8, wherein the metal cation is a metal element selected from the group consisting of Cu and Mo.

11. The composition according to claim 1, wherein the bismuth oxyfluoride compound comprises nanocrystallites that are less than about 100 nm in diameter.

12. An electrode composition for an energy storage electrochemical cell comprising a nanocrystalline bismuth oxyfluoride compound nanocomposite, wherein the electrode composition is capable of being cycled between about 2 volts and about 4.5 volts relative to a Li/Li+ reference potential.

13. The composition according to claim 12, wherein the nanocrystalline bismuth oxyfluoride compound nanocomposite comprises $BiO_xF_{z-2x}$, wherein $0<x<1.5$ and $3 \leq z \leq 5$.

14. The composition according to claim 12, wherein the bismuth oxyfluoride compound is BiOF.

15. The composition according to claim 12, wherein the bismuth oxyfluoride compound is $BiO_{0.5}F_2$.

16. The composition according to claim 12, wherein the bismuth oxyfluoride compound further comprises a metal cation in partial substitution of the Bi cation.

17. The composition according to claim 16, wherein the metal cation is a metal element selected from the group consisting essentially of Fe, B, Co, Ni, Mn, V, Mo, Pb, Sb, Cu, Sn, Nb, Cr, Ag and Zn.

18. The composition according to claim 16, wherein the metal cation is a metal element selected from the group consisting of Cu and Mo.

19. The composition according to claim 12, wherein the nanocrystalline bismuth oxyfluoride compound of the nanocomposite is comprised of $Bi^{5+}$.

20. The composition according to claim 13, wherein the nanocrystalline bismuth oxyfluoride compound of the nanocomposite is comprised of $Bi^{5+}$.

21. The composition according to claim 12, wherein the nanocrystalline bismuth oxyfluoride compound of the nanocomposite is comprised of $Bi^{3+}$.

22. The composition according to claim 12, further comprising a conductive matrix.

23. The composition according to claim 22, wherein the conductive matrix is a conductive matrix selected from the group consisting of a metal oxide, a metal fluoride and a metal oxyfluoride.

24. The composition according to claim 23, wherein a metal from the metal oxide, the metal fluoride and the metal oxyfluoride is a metal selected from the group consisting of Fe, B, Bi, Co, Ni, Mn, V, Mo, Pb, Sb, Cu, Sn, Nb, Cr, Ag and Zn.

25. The composition according to claim 22, wherein the conductive matrix is present in an amount that is less than about 50 weight % of the nanocomposite.

26. The composition according to claim 24, wherein the conductive matrix is carbon.

27. The composition according to claim 26, wherein the carbon is in an amount that is less than about 5 weight percent of the nanocomposite.

28. The composition according to claim 12, wherein the nanocrystalline bismuth oxyfluoride nanocomposite further comprises carbon.

29. The composition according to claim 28, wherein the carbon is in an amount that is less than about 50 weight percent carbon of the nanocomposite.

30. The composition according to claim 12, wherein the nanocrystalline bismuth oxyfluoride compound of the nanocomposite comprises crystallites that are less than about 100 nm in diameter.

31. The composition according to claim 12, wherein the nanocomposite has a rechargeable specific capacity when a current passes through the nanocomposite in a direction opposite a discharge direction.

32. The composition according to claim 12, wherein the composition is a component of an electrode of a rechargeable battery.

33. The composition according to claim 12, wherein the nanocrystalline bismuth oxyfluoride compound of the nanocomposite is capable of a conversion reaction.

34. The composition according to claim 33, wherein the conversion reaction is reversible.

35. An electrode composition comprising a bismuth oxyfluoride nanocomposite, wherein the electrode composition is capable of being cycled between about 2 volts and about 4.5 volts relative to a Li/Li+ reference potential.

36. The composition according to claim 35, wherein the bismuth oxyfluoride nanocomposite comprises $BiO_xF_{z-2x}$, wherein $0<x<1.5$ and $3 \leq z \leq 5$.

37. The composition according to claim 35, wherein the bismuth oxyfluoride compound is BiOF.

38. The composition according to claim 35, wherein the bismuth oxyfluoride compound is $BiO_{0.5}F_2$.

39. The composition according to claim 35, wherein the bismuth oxyfluoride compound further comprises a metal cation in partial substitution of the Bi cation.

40. The composition according to claim 39, wherein the metal cation is a metal element selected from the group consisting essentially of Fe, B, Co, Ni, Mn, V, Mo, Pb, Sb, Cu, Sn, Nb, Cr, Ag and Zn.

41. The composition according to claim 39, wherein the metal cation is a metal clement selected from the group consisting of Cu and Mo.

42. The composition according to claim 35, wherein the bismuth oxyfluoride compound of the nanocomposite is comprised of $Bi^{5+}$.

43. The composition according to claim 36, wherein the bismuth oxyfluoride compound of the nanocomposite is comprised of $Bi^{5+}$.

44. The composition according to claim 35, wherein the bismuth oxyfluoride compound of the nanocomposite is comprised of $Bi^{3+}$.

45. The composition according to claim 35, further comprising a conductive matrix.

46. The composition according to claim 45, wherein the conductive matrix is a conductive matrix selected from the group consisting of a metal oxide, a metal fluoride and a metal oxyfluoride.

47. The composition according to claim 46, wherein a metal from the metal oxide, the metal fluoride and the metal oxyfluoride is a metal selected from the group consisting of Fe, B, Bi, Co, Ni, Mn, V, Mo, Pb, Sb, Cu, Sn, Nb, Cr, Ag and Zn.

48. The composition according to claim 45, wherein the conductive matrix is present in an amount that is less than about 50 weight % of the nanocomposite.

49. The composition according to claim 45, wherein the conductive matrix is carbon.

50. The composition according to claim 49, wherein the carbon is in an amount that is less than about 5 weight percent of the nanocomposite.

51. The composition according to claim 35, wherein the bismuth oxyfluoride nanocomposite further comprises carbon.

52. The composition according to claim 51, wherein the carbon is in an amount that is less than about 50 weight percent carbon of the nanocomposite.

53. The composition according to claim 35, wherein the bismuth oxyfluoride compound of the nanocomposite comprises crystallites that are less than about 100 nm in diameter.

54. The composition according to claim 35, wherein the bismuth oxy fluoride compound of the nanocomposite comprises crystallites that are more than about 100 nm in diameter.

55. The composition according to claim 35, wherein the nanocomposite has a rechargeable specific capacity when a current passes through the nanocomposite in a direction opposite a discharge direction.

56. The composition according to claim 35, wherein the composition is utilized in an electrode of a rechargeable battery.

57. The composition according to claim 35, wherein the bismuth oxyfluoride compound of the nanocomposite is capable of a conversion reaction.

58. The composition according to claim 35, wherein the conversion reaction is reversible.

59. An electrochemical cell comprising:
a negative electrode:
a positive electrode comprising a bismuth oxyfluoride compound nanocomposite; and a
separator disposed between the negative and positive electrodes.

60. The electrochemical cell according to claim 59, wherein the nanocomposite comprises $BiO_xF_{z-2x}$, wherein $0<x<1.5$ and $3 \leq z \leq 5$.

61. The electrochemical cell according to claim 59, wherein the bismuth oxyfluoride compound is BiOF.

62. The electrochemical cell according to claim 59, wherein the bismuth oxyfluoride compound is $BiO_{0.5}F_2$.

63. The electrochemical cell according to claim 59, wherein the bismuth oxyfluoride compound further comprises a metal cation is in partial substitution of the Bi cation.

64. The electrochemical cell according to claim 63, wherein the metal cation is a metal element selected from the group consisting essentially of Fe, B, Co, Ni, Mn, V, Mo, Pb, Sb, Cu, Sn, Nb, Cr, Ag and Zn.

65. The electrochemical cell according to claim 63, wherein the metal cation is a metal element selected from the group consisting of Cu and Mo.

66. The electrochemical cell according to claim 59, wherein the bismuth oxyfluoride compound of the nanocomposite is comprised of $Bi^{5+}$.

67. The electrochemical cell according to claim 60, wherein the bismuth oxyfluoride compound of the nanocomposite is comprised of $Bi^{5+}$.

68. The electrochemical cell according to claim 59, wherein the bismuth oxy fluoride compound of the nanocomposite is comprised of $Bi^{3+}$.

69. The electrochemical cell according to claim 59, further comprising a conductive matrix.

70. The electrochemical cell according to claim 69, wherein the conductive matrix is a conductive matrix selected from the group consisting of a metal oxide, a metal fluoride and a metal oxyfluoride.

71. The electrochemical cell according, to claim 70, wherein a metal from the metal oxide, the metal fluoride and the metal oxyfluoride is a metal selected from the group consisting of Fe, B, Bi, Co, Ni, Mn, V, Mo, Pb, Sb, Cu, Sn, Nb, Cr, Ag and Zn.

72. The electrochemical cell according to claim 69, wherein the conductive matrix is present in an amount that is less than about 50 weight % of the nanocomposite.

73. The electrochemical cell according to claim 69, wherein the conductive matrix is carbon.

74. The electrochemical cell according to claim 73, wherein the carbon is in an amount that is less than about 5 weight percent of the nanocomposite.

75. The electrochemical cell according to claim 59, wherein the bismuth oxyfluoride nanocomposite further comprises carbon.

76. The electrochemical cell according to claim 75, wherein the carbon is in an amount that is less than about 50 weight percent carbon of the nanocomposite.

77. The electrochemical cell according to claim 59, wherein the bismuth oxyfluoride compound of the nanocomposite comprises crystallites that are less than about 100 nm in diameter.

78. The electrochemical cell according to claim 59, wherein the bismuth oxyfluoride compound of the nanocomposite comprises crystallites that are more than about 100 nm in diameter.

79. The electrochemical cell according to claim 59, wherein the nanocomposite has a rechargeable specific capacity when a current passes through the nanocomposite in a direction opposite a discharge direction.

80. The electrochemical cell according to claim 59, wherein the electrochemical cell is rechargeable.

81. The composition according to claim 59, wherein the nanocrystalline bismuth oxyfluoride compound of the nanocomposite is capable of a conversion reaction.

82. The composition according to claim 81, wherein the conversion reaction is reversible.

83. The electrochemical cell according to claim 59, further comprising an electrolyte.

* * * * *